W. D. OSBRON.
MARKING DEVICE FOR COMBINED CULTIVATORS AND FERTILIZER DISTRIBUTERS.
APPLICATION FILED MAY 19, 1910.
992,041.
Patented May 9, 1911.
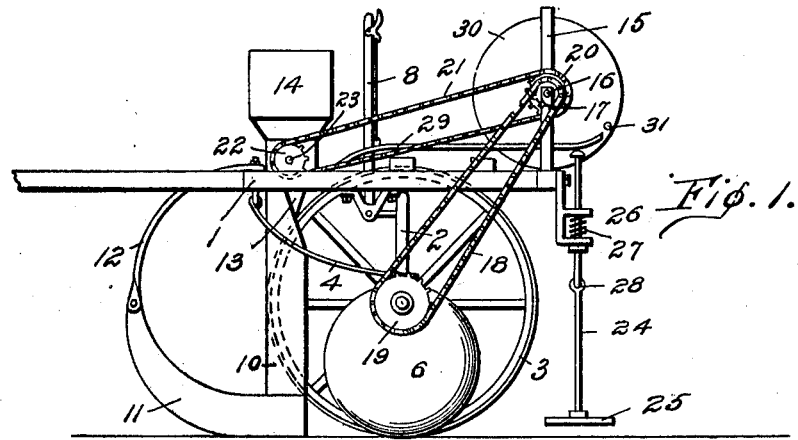
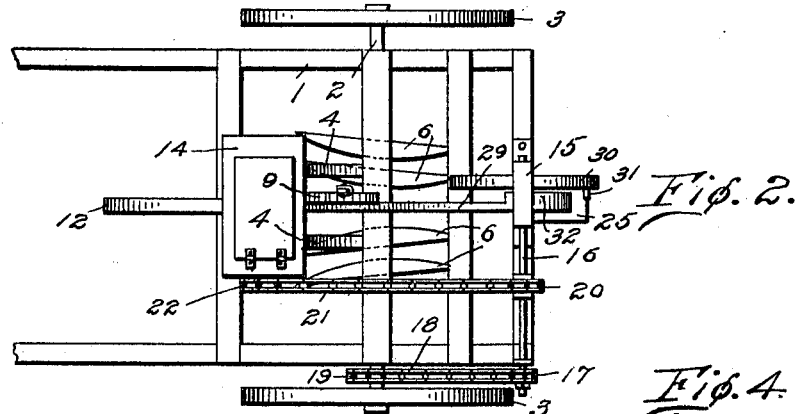
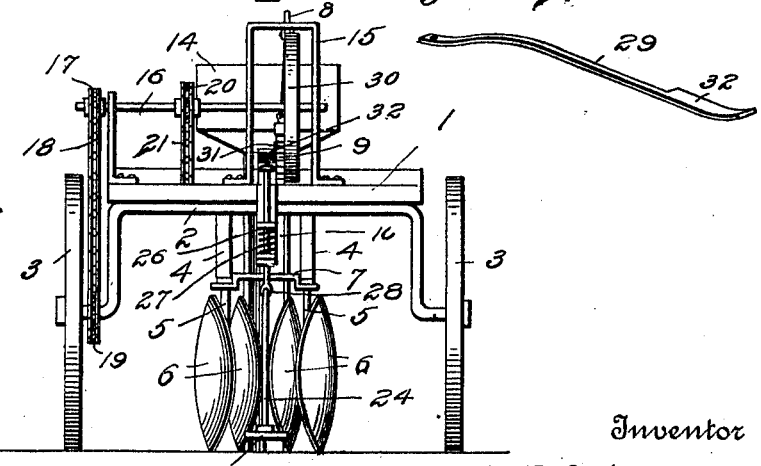
Witnesses
Inventor
W. D. Osbron
by
Attorneys

UNITED STATES PATENT OFFICE.

WILLIAM DANIEL OSBRON, OF MURRAY, KENTUCKY.

MARKING DEVICE FOR COMBINED CULTIVATORS AND FERTILIZER-DISTRIBUTERS.

992,041. Specification of Letters Patent. Patented May 9, 1911.

Application filed May 19, 1910. Serial No. 562,159.

*To all whom it may concern:*

Be it known that I, WILLIAM D. OSBRON, a citizen of the United States, residing at Murray, in the county of Calloway and State of Kentucky, have invented certain new and useful Improvements in Marking Devices for Combined Cultivators and Fertilizer-Distributers; and I do declare the following to be a full, clear, and exact description of the invention, such as will enable others skilled in the art to which it appertains to make and use the same.

This invention relates to improvements in marking devices for combined cultivators and fertilizer distributers, and its object is to provide an improved automatically operated marker whereby the spaces for planting may be indicated.

With this and other objects in view, the invention consists of certain novel features of construction, combination and arrangement of parts as will be more fully described and particularly pointed out in the appended claim.

In the accompanying drawings:—Figure 1 is a side elevation of a combined cultivator and fertilizer distributer provided with the marking device, the inner supporting wheel being removed. Fig. 2 is a top plan view; Fig. 3 is a rear view; and, Fig. 4 is a detail view of the marker operating spring.

Referring more particularly to the drawings 1 denotes the main supporting frame of the machine said frame being secured in any suitable manner to an arched axle 2 on which is mounted the usual supporting wheels 3.

Hingedly connected at their forward ends to the front portion of the frame 1 are rearwardly and downwardly projecting cultivator beams 4 to the rear ends of which are secured in any suitable manner cultivator standards 5 on the lower ends of which are revolubly mounted pairs of cultivator disks 6. The rear ends of the cultivator beams are preferably connected together by a cross bar 7 to which is connected in any suitable manner the lower end of a raising and lowering lever 8. The lever 8 is pivotally mounted on the frame of the machine and carries a pawl which is adapted to be engaged with the teeth of a segmental rack 9 whereby the lever is locked in its adjusted positions for supporting the disks in an elevated position.

Arranged at the front portion of the machine and connected at its upper end to the front cross bar of the frame 1 is a standard 10 to the lower end of which is secured a plow or furrow opener 11 which may be of any suitable construction. The plow or shovel and the standard 10 are braced by a suitable brace bar 12 connected thereto and to the frame 1 in any suitable manner.

Arranged immediately in rear of the standard 10 and plow or shovel 11 is a fertilizer discharging tube 13 the lower end of which is disposed immediately in rear of the plow and is adapted to discharge fertilizer directly into the furrow opened by the plow. The upper end of the discharge chute 13 is connected with a suitable hopper 14 arranged on the frame 1 of the machine.

Revolubly mounted in suitable bearing brackets 15 secured to and projecting above the rear end of the frame 1 is a counter shaft 16 on one end of which is fixedly mounted a spur gear pinion 17 which is connected by a sprocket chain 18 to a sprocket wheel 19 on the hub of one of the supporting wheels 3 of the machine whereby said counter shaft is driven by the movement of said wheel. On the counter shaft 16 is also fixedly mounted a sprocket gear 20 which is connected by a sprocket chain 21 with a sprocket pinion 22 mounted on the shaft 23 of a fertilizer feeding mechanism (not shown) but which is arranged in the hopper 14 and which may be of any suitable construction for feeding or forcing fertilizer from the hopper into the discharge tube whereby it is conveyed to and discharged into the furrow as hereinbefore described.

In connection with the machine I provide a marking mechanism whereby the places for planting may be indicated so that the seed or plants may be planted or set out in proper positions where they will obtain the most benefit from the fertilizer distributed in the furrow. In this connection it will be noted that this machine does not plant seed or set plants in the ground but merely hills up a row, deposits fertilizer in the row, and marks the different points in the row where seed or plants may be deposited to the best advantage. The marking device is here shown and preferably consists of a plunger rod 24 having on its lower end a flat head 25. The plunger rod 24 is slidably mounted at its upper end in a suitable guide supporting bracket 26 secured to the rear end of the frame 1.

Arranged on the plunger rod in the bracket 26 is a coiled retracting spring 27 whereby the plunger is retracted and normally held in a retracted position. The plunger rod 24 is preferably jointed near its upper end as shown at 28 whereby should the lower portion thereof come into engagement with stumps or other obstructions said plunger will swing back and thus pass over the obstructions without being broken or injured.

In order to operate the plunger for marking the ground at suitable intervals for planting I provide a marker operating mechanism comprising a stiff spring 29 the forward end of which is rigidly secured to the frame 1 in any suitable manner while the rear end projects over and is in position to engage the upper end of the plunger rod whereby said spring when properly operated will strike the upper end of the plunger rod and thus force the plunger head downwardly into engagement with the ground. The spring 29 is periodically operated by means of a disk 30 which is fixedly mounted on the shaft 16 and is revolved thereby when said shaft is driven. At a suitable position on the disk 30 is secured a laterally projecting trip pin or stud 31 which at each revolution of the disk is brought into engagement with a lateral projection 32 on the rear end of the spring 29 thereby lifting said end of the spring to a limited distance whereupon when the trip pin is moved around sufficiently to disengage the projection 32 said end of the spring will spring back into forcible engagement with the upper end of the plunger rod 24 thereby forcing the latter and the plunger head downwardly and into engagement with the ground thus marking the same.

The cultivator disks are primarily intended for throwing the soil back into the furrow in the form of hills and thus covering the fertilizer deposited therein. It is obvious however that the fertilizer distributer mechanism and the marking mechanism may be removed from the machine and the disks thereof employed solely for the purpose of cultivating the soil.

The machine may be provided with any suitable draft devices or means for hitching the draft animals thereto.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described the invention what I claim is:

In an implement of the character set forth, the combination of a main frame, supporting wheels therefor, an inverted U-shaped bracket on the main frame, a transverse shaft journaled in said bracket and actuated from one of said wheels, a disk fixed to said shaft within the bracket and provided with a laterally projecting tappet pin, a second bracket depending from the main frame and having vertical guide openings, a vertically disposed plunger rod slidable in the guide openings of the last mentioned bracket, a spring in the last mentioned bracket for elevating said plunger rod, a marking head pivotally connected to the lower end of said plunger rod and depending therefrom, and a horizontally arranged spring having one end secured on the main frame and its free end disposed over and in contact with the upper end of said plunger rod, the free end of said spring being formed with a laterally projecting portion disposed in the path of the tappet pin on said disk whereby said spring will be intermittently lifted and released by said tappet pin as the disk is rotated.

In testimony whereof I have hereunto set my hand in presence of two subscribing witnesses.

WILLIAM DANIEL OSBRON.

Witnesses:
E. G. HUGHES,
S. H. DEES.